US012565183B2

(12) United States Patent
van Thiel

(10) Patent No.: US 12,565,183 B2
(45) Date of Patent: Mar. 3, 2026

(54) ELECTROPNEUMATIC VALVE ASSEMBLY, ELECTROPNEUMATIC BRAKE SYSTEM, COMMERCIAL VEHICLE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 407 days.

(21) Appl. No.: 17/858,292

(22) Filed: Jul. 6, 2022

(65) Prior Publication Data

US 2023/0012205 A1     Jan. 12, 2023

(30) Foreign Application Priority Data

Jul. 6, 2021     (DE) ...................... 10 2021 117 461.9

(51) Int. Cl.
B60T 13/68          (2006.01)
B60T 15/02          (2006.01)
B60T 15/04          (2006.01)

(52) U.S. Cl.
CPC .......... B60T 13/683 (2013.01); B60T 15/027 (2013.01); B60T 15/041 (2013.01)

(58) Field of Classification Search
CPC .................................................... B60T 15/041
See application file for complete search history.

(56) References Cited

U.S. PATENT DOCUMENTS

| | | | | |
|---|---|---|---|---|
| 2,734,609 A | * | 2/1956 | Fritzsch | ................. F16D 25/14 |
| | | | | 192/85.48 |
| 2020/0290585 A1 | | 9/2020 | Farres et al. | |

FOREIGN PATENT DOCUMENTS

| | | | | |
|---|---|---|---|---|
| CN | 204985882 U | * | 1/2016 | |
| DE | 19618402 A1 | * | 11/1997 | ............. B60T 8/175 |
| DE | 10 2015 008 377 A1 | | 12/2016 | |
| DE | 10 2016 011 390 A1 | | 3/2018 | |
| DE | 102017009578 A | * | 4/2019 | |
| DE | 102018108091 A1 | * | 10/2019 | ........... B60T 13/266 |
| DE | 102018123750 A1 | * | 3/2020 | ............. B60T 13/36 |
| EP | 1448925 B1 | * | 2/2006 | ............. F16L 25/01 |
| EP | 2165902 A1 | * | 3/2010 | ........... B60T 13/665 |
| WO | WO-2007065498 A1 | * | 6/2007 | ........... B60T 13/683 |

* cited by examiner

*Primary Examiner* — Melody M Burch
(74) *Attorney, Agent, or Firm* — Walter Ottesen, P.A.

(57) ABSTRACT

An electropneumatic valve assembly for actuating a parking brake function of an electropneumatic brake system of a commercial vehicle has a parking brake valve unit which receives supply pressure from a supply pressure path and outputs a parking brake pressure at least at one spring brake port in dependence on an electronic parking brake signal. A pneumatically switchable safety valve connects the supply pressure path to at least a first compressed air supply and in a supply position connects the compressed air supply to the supply pressure path and in an air release position releases air from the supply pressure path. A pneumatic safety valve control port of the safety valve is connected to the at least one compressed air supply. The safety valve switches into the supply position if the supply pressure provided by the at least a first compressed air supply exceeds a threshold value.

20 Claims, 2 Drawing Sheets

ELECTROPNEUMATIC VALVE ASSEMBLY, ELECTROPNEUMATIC BRAKE SYSTEM, COMMERCIAL VEHICLE

CROSS REFERENCE TO RELATED APPLICATION

This application claims priority of German patent application no. 10 2021 117 461.9, filed Jul. 6, 2021, the entire content of which is incorporated herein by reference.

TECHNICAL FIELD

The disclosure relates to an electropneumatic valve assembly. The disclosure relates also to an electropneumatic brake system having an electropneumatic valve assembly of the type mentioned above and to a commercial vehicle having an electropneumatic brake system of the type mentioned above.

BACKGROUND

In modern electropneumatic brake systems, in particular in parking brake systems, it is important that the brake system behaves reliably and predictably. This applies both to normal operation of the commercial vehicle and also in the event of a fault in the commercial vehicle, in particular in the electropneumatic brake system.

In particular in the event of a pressure drop in a compressed air supply of the brake system, for example as a result of leakages, engagement of the parking brake and thus uncontrolled deceleration of the commercial vehicle can occur at an operating point which cannot reliably be determined, in particular at a supply pressure which cannot be predicted. Such uncontrolled behavior can be detrimental to the safety of the vehicle, of the occupants of the vehicle and of other road users.

Cases also occur in which a pressure drop in the compressed air supply is brought about deliberately, for example as a purposive measure for producing emergency braking. Thus, DE 10 2016 011 390 A1 describes an electropneumatic parking brake valve device with three pneumatic ports, which form a compressed air input for connection to a compressed air supply, a compressed air output for connection to the spring parking brake, and an air release port, wherein there is provided in the electropneumatic parking brake valve device, between a control volume and a compressed air input and/or an air release port, a bypass line having a bypass valve device which is pneumatically actuated by the control volume for connecting or separating the control volume to or from a port, and in at least one of the steady-state positions the bypass valve device is actuated by the control volume such that it at least partially bypasses an inlet and outlet valve device for admitting air to the control volume and connects the control volume to the port.

Reliable and predictable behavior of the brake system, in particular of a parking brake function, is important also in such cases of a purposive pressure drop.

Electropneumatic brake systems are in need of further improvement, in particular with regard to reliable and predictable behavior. This applies in particular to electropneumatic parking brake systems or brake systems with a parking brake function.

It is therefore desirable to improve the functioning of the electropneumatic valve assembly for an electropneumatic brake system.

SUMMARY

It is an object of the disclosure to provide an improved electropneumatic valve assembly. In particular, there is to be provided an electropneumatic valve assembly which ensures controlled and predictable engagement of a parking brake function of the electropneumatic brake system in the event of a pressure drop in a compressed air supply.

The disclosure proceeds from an electropneumatic valve assembly for actuating a parking brake function of an electropneumatic brake system of a commercial vehicle, having a parking brake valve unit which receives supply pressure from a supply pressure path and outputs a parking brake pressure at least at one spring brake connection in dependence on an electronic parking brake signal.

According to the disclosure there is provided in the electropneumatic valve assembly according to the first aspect of the disclosure a pneumatically switchable safety valve which connects the supply pressure path to at least a first compressed air supply and which in a supply position connects the compressed air supply to the supply pressure path and in an air release position releases air from the supply pressure path, wherein a pneumatic safety valve control port of the safety valve is connected to the at least one compressed air supply and receives supply pressure therefrom, and wherein the safety valve switches into the supply position if the supply pressure provided by the at least a first compressed air supply exceeds a first threshold value.

The disclosure includes the finding that, via a pneumatically switchable safety valve which connects the supply pressure path to at least a first compressed air supply, actuation and/or supply of the parking brake valve unit can take place in an improved and controlled manner, namely advantageously in dependence on a first threshold value. In this manner, the admission of air to the parking brake valve unit in order to cancel the parking brake function, in particular to release the parking brake cylinders of a commercial vehicle, can be brought about in a predictable manner, namely when the supply pressure exceeds the first threshold value.

Behavior of the electropneumatic brake system that can better be predicted and in particular is expected by the driver is achieved. This is the case because functioning of the parking brake function or of the electropneumatic brake system is available precisely or approximately at the point at which the supply pressure exceeds the first threshold value. This is to be seen as an advantage in particular with regard to the prior art, in which the transition between a non-functioning and a functioning parking brake function cannot be determined precisely and depends on various factors.

Because the pneumatic safety valve is pneumatically switchable and the pneumatic safety valve control port is connected to the at least one compressed air supply, relatively robust control of the safety valve, which is independent of any further control means and in particular functions in as direct dependence as possible on the supply pressure, is advantageously achieved.

The first threshold value can advantageously be so chosen, in particular sufficiently high with a safety margin, that, when it is exceeded, the supply pressure is sufficiently high that functioning of the parking brake function is certain or at least very probable. In particular, the first threshold value is between 0.172 MPa (25 psi) and 0.310 MPa (45 psi), preferably between 0.207 MPa (30 psi) and 0.276 MPa (40 psi), particularly preferably 0.241 MPa (35 psi).

It is preferably provided that the safety valve switches into the air release position when the supply pressure provided by the at least a first compressed air supply falls below a second threshold value. In this manner, the release of air from the parking brake valve unit in order to initiate the parking brake function can be effected in a predictable manner, namely when the supply pressure falls below the second threshold value.

In particular, the second threshold value is between 0.138 MPa (20 psi) and 0.276 MPa (40 psi), preferably between 0.172 MPa (25 psi) and 0.241 MPa (35 psi), particularly preferably 0.207 MPa (30 psi). Because the first threshold value is different from the second threshold value, in particular the first threshold value is greater than the second threshold value, hysteresis behavior of the safety valve is advantageously achieved. This is advantageous in particular when the supply pressure fluctuates slightly about a particular value which is in the vicinity of a switching limit. Via a first threshold value and a second threshold value which is different therefrom, repeated switching in the event of such fluctuations is avoided and a robust switching behavior of the safety valve is thus advantageously achieved. The hysteresis behavior also has the result that the engagement of the parking brake takes place at a lower supply pressure and a higher supply pressure is required to release the parking brake again. It can thereby be ensured, inter alia, that a sufficiently high supply pressure is present before the parking brake is released.

A described hysteresis behavior with a first threshold value and a second threshold value which is different therefrom can be achieved in a pneumatic safety valve by the choice and dimensioning of a suitable seal and/or suitable guide elements and/or a suitable return spring, and advantageously by the frictional and/or spring forces resulting therefrom.

Via the safety valve, the parking brake function can purposively be activated, for example for emergency braking, by purposively lowering the supply pressure below a switching limit, in particular below the second threshold value. Lowering can advantageously take place by so-called pumping down and/or the discharging of compressed air from the compressed air supply into the environment. Such a lowering of the supply pressure can advantageously take place via switchable valves with an advantageously relatively large nominal width. Such valves can serve a different primary function. For example, one or more ABS valves from a service brake system can be used for lowering the supply pressure.

In particular, on lowering of the supply pressure in at least one compressed air supply, in particular in all the compressed air supplies, of the electropneumatic brake system, the supply pressure falls below the second threshold value. Switching into the air release position for releasing air from the supply pressure path and thus for activating a parking brake function thereby takes place.

In the context of a further embodiment, it is provided that the parking brake valve unit has a main valve unit which is pneumatically connected via the supply pressure path to at least the first compressed air supply and is configured to output the parking brake pressure at the at least one spring brake port in dependence on the electronic parking brake signal.

An embodiment of the disclosure is further developed by a pilot unit, wherein the main valve unit has a pneumatically actuated main valve which is controllable via the pilot unit in dependence on the electronic parking brake signal, wherein the pilot unit is pneumatically connected to a control port of the pneumatically actuated main valve in order to provide a pilot pressure, wherein the pneumatically actuated main valve is pneumatically connected to a supply branch of the supply pressure path in order to receive the supply pressure, and the pilot unit is pneumatically connected to a control branch of the supply pressure path in order to receive the supply pressure.

An embodiment of the disclosure is further developed in that the safety valve is arranged in the supply branch. In such a further embodiment, a control branch continues to be functional independently of the safety valve. The functioning of the main valve is thereby influenced by the safety valve in that a supply branch, in particular the pneumatic connection between the at least a first compressed air supply and a supply port of the main valve, is connected.

An embodiment of the disclosure is further developed in that the safety valve is arranged in the control branch. In such a further embodiment, a supply branch continues to be functional independently of the safety valve. The functioning of the main valve is thereby influenced by the safety valve in that a control branch, in particular the pneumatic connection between the at least a first compressed air supply and a control port of the main valve, is connected.

In a further embodiment, it is provided that the safety valve is arranged in a main portion of the supply pressure path. In such a further embodiment, air can advantageously be admitted to or released from the main valve as a whole, compared to a further embodiment in which either a control branch or a supply branch is connected. In particular, owing to the arrangement of the safety valve, air can advantageously be admitted to and/or released from both branches, the supply branch and the control branch, by switching of the safety valve.

An embodiment of the disclosure is further developed in that the pneumatically actuated main valve has a main valve return spring which is configured to switch the pneumatically actuated main valve into a main valve position, in which air is released from the spring brake port, when the pilot pressure is less than a minimum pilot pressure. The main valve return spring advantageously has a spring constant which is configured such that there results a switching behavior in dependence on the minimum pilot pressure. As a result of the main valve return spring, low pressures below the minimum pilot pressure, which are caused by leakages for example, have no direct influence on the switching behavior of the main valve. In particular, a state in which air is released from the main valve can be secured against such low pressures.

An embodiment of the disclosure is further developed in that the pneumatically actuated main valve is a relay valve.

In a further embodiment of the disclosure there is provided a trailer valve unit having a trailer supply valve which provides a trailer supply pressure at a trailer supply port in dependence on an electronic trailer brake signal, wherein the trailer valve unit is pneumatically connected to the supply pressure path in order to receive the supply pressure. Via the pneumatic connection of the trailer valve unit to the supply pressure path, the trailer valve unit can likewise be secured by the safety valve according to the concept of the disclosure.

In a further embodiment of the disclosure, a trailer pilot unit for providing a trailer control pressure in dependence on the electronic trailer brake signal is provided, wherein the trailer supply valve is pneumatically actuatable in dependence on the trailer control pressure.

An embodiment of the disclosure is further developed in that the safety valve is in the form of a 3/2-way valve.

In a further embodiment, it is provided that the safety valve has a return spring, configured to switch the safety valve into the air release position, wherein the return spring acts against the supply pressure present at the pneumatic safety valve control port. In particular, the return spring is configured to move the safety valve into the air release position when no supply pressure or a supply pressure below the second threshold value is present at the safety valve control port.

It can advantageously be provided that the return spring has a spring constant such that the safety valve automatically switches into the air release position when the supply pressure present at the pneumatic safety valve control port falls below the second threshold value and/or automatically switches into the supply position when the supply pressure present at the pneumatic safety valve control port exceeds the first threshold value.

Within the context of a further embodiment there is provided an emergency release port which can be pneumatically connected to the control port in order to provide an emergency release pressure. Via an emergency release port, the parking brake function, in particular an engaged spring brake cylinder, can advantageously be released even if the supply pressure is below the first threshold value. In particular, the emergency release port can be used pneumatically with a further compressed air source which is independent of the compressed air supply that supplies the parking brake function. Such a compressed air source can be, for example, a compressed air source that supplies the service brake system or an externally connected compressed air source.

Within the context of a further embodiment it is provided that there is arranged at the emergency release port a check valve which opens in the direction of the control port and closes in the opposite direction.

An embodiment is developed further by an additional parking brake port which can be pneumatically connected to the control port in order to provide an additional parking brake pressure. The additional parking brake port can advantageously be in the form of an anti-compound port.

An embodiment of the disclosure can advantageously be developed further by a selection valve having a first selection valve port which is connected to the additional parking brake port, a second selection valve port which is connected to the emergency release port, and a third selection valve port which is connected to the control port, wherein the selection valve is configured to connect to the third selection valve port the selection valve port, from the first selection valve port and the second selection valve port, at which the higher pressure is present.

In a second aspect, the disclosure further provides, for achieving the object, an electropneumatic brake system for a commercial vehicle, having at least a first compressed air supply, an electropneumatic valve assembly for actuating a parking brake function of the electropneumatic brake system, having a parking brake valve unit which receives supply pressure from a supply pressure path and outputs a parking brake pressure at least at one spring brake port in dependence on an electronic parking brake signal, at least one spring brake cylinder which is pneumatically connected to the at least one spring brake port in order to receive the parking brake pressure.

In the electropneumatic brake system according to the second aspect of the disclosure there is provided a pneumatically switchable safety valve which connects the supply pressure path to at least the first compressed air supply and which in a supply position connects the compressed air supply to the supply pressure path and in an air release position releases air from the supply pressure path, wherein a pneumatic safety valve control port of the safety valve is connected to the at least one compressed air supply and receives supply pressure therefrom, and wherein the safety valve switches into the supply position if the supply pressure provided by the at least a first compressed air supply exceeds a first threshold value.

It is preferably provided that the safety valve switches into the air release position when the supply pressure provided by the at least a first compressed air supply falls below the second threshold value.

In a third aspect, the disclosure further provides, for achieving the object, a commercial vehicle, having an electropneumatic valve assembly according to the first aspect of the disclosure and/or an electropneumatic brake system according to the second aspect of the disclosure.

It will be appreciated that the electropneumatic valve assembly according to the first aspect of the disclosure, the electropneumatic brake system according to the second aspect of the disclosure and the commercial vehicle according to the third aspect of the disclosure have identical and similar sub-aspects.

BRIEF DESCRIPTION OF THE DRAWINGS

The invention will now be described with reference to the drawings wherein.

DESCRIPTION OF THE PREFERRED EMBODIMENTS

Figure 1:
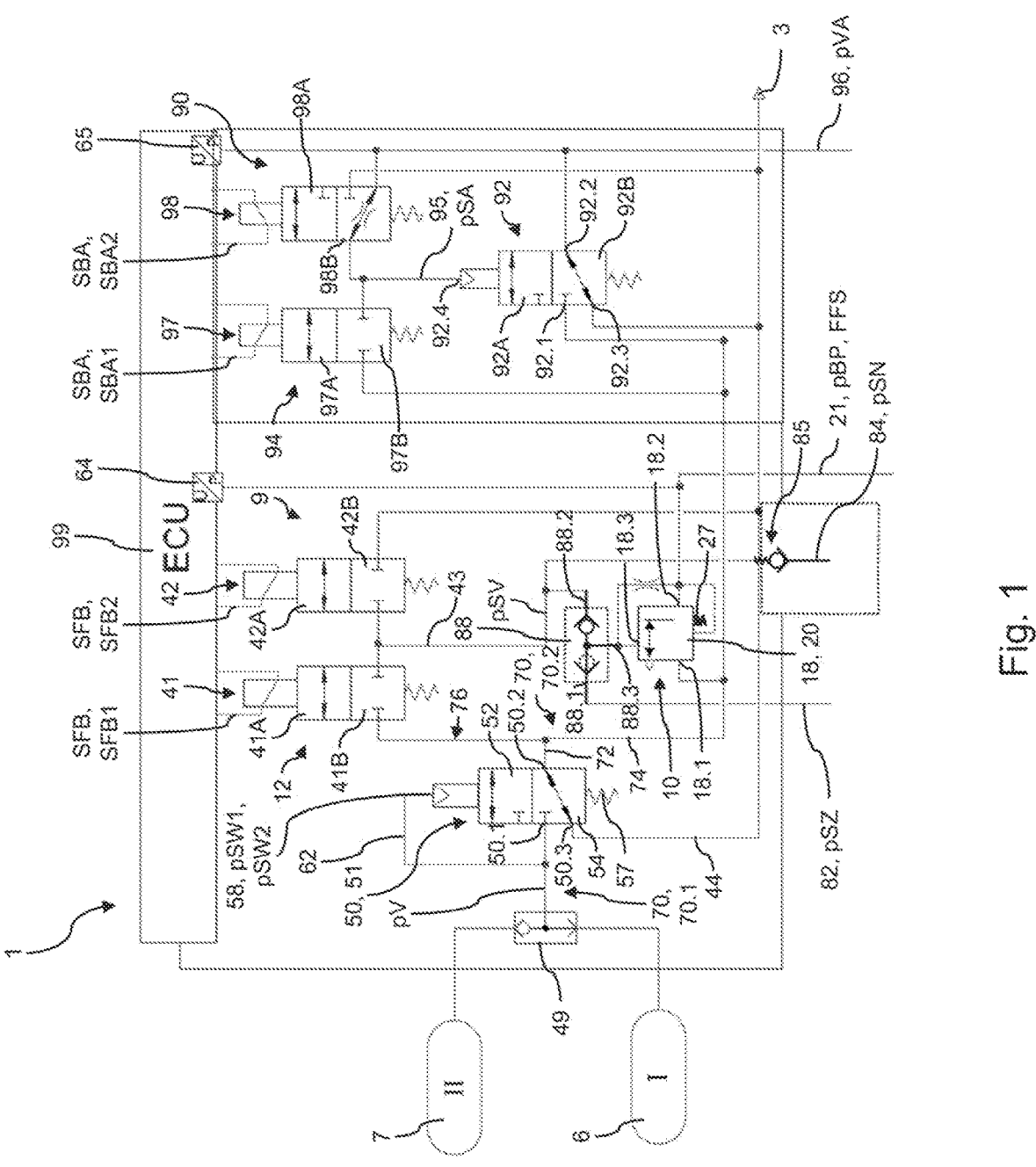
FIG. 1 shows an embodiment of an electropneumatic valve assembly according to the disclosure; and, FIG. 2 shows an electropneumatic brake system having a valve assembly according to the disclosure.

FIG. 1 shows an electropneumatic valve assembly 1 according to the concept of the disclosure. The electropneumatic valve assembly 1 has a parking brake valve unit 9 with a supply pressure path 70. The parking brake valve unit 9 is configured to output a parking brake pressure pBP at least at one spring brake port 21 in dependence on an electronic parking brake signal SFB.

The supply pressure path 70 has a main portion 72. The main portion 72 is pneumatically connected via a supply shuttle valve 49 to a first compressed air supply 6 and a second compressed air supply 7 in order to receive a supply pressure pV. The supply shuttle valve 49 is in the form of a select-high shuttle valve so that, of the first compressed air supply 6 and the second compressed air supply 7, the compressed air supply in which the higher supply pressure pV prevails is connected to the main portion 72 and the respective other compressed air supply 6, 7 is closed.

A safety valve 50 is arranged in the main portion 72 of the supply pressure path 70. The safety valve 50 is in the form of a 3/2-way valve 51. The safety valve 50 has a first safety valve port 50.1 which is pneumatically connected on the supply side to the supply pressure path 70, here the main portion 72. The safety valve 50 has a second safety valve port 50.2 which is pneumatically connected on the main valve side to the supply pressure path 70, here the main portion 72. The safety valve 50 has a third safety valve port 50.3 which is pneumatically connected to an air release line 44. The air release line 44 is connected to an air release port 3 which releases air into the environment.

The safety valve 50 has a safety valve control port 58 which is pneumatically connected via an actuation path 62 to the at least one compressed air supply 6, here to a supply-side part 70.1 of the supply pressure path 70. Via the actuation path 62, the supply pressure pV for controlling the safety valve 50 is provided at the safety valve control port 58.

In an air admission position 52 of the safety valve 50, the first safety valve port 50.1 is pneumatically connected to the second safety valve port 50.2, and the third safety valve port 50.3 is preferably closed. In the air admission position 52, a supply-side part 70.1 of the supply pressure path 70 is thus pneumatically connected to a main-valve-side part 70.2 of the supply pressure path 70. In an air release position 54 of the safety valve 50, the second safety valve port 50.2 is pneumatically connected to the third safety valve port 50.3, and the first safety valve port 50.1 is preferably closed. In the air release position 54, a main-valve-side part 70.2 of the supply pressure path 70 is thus pneumatically connected to the air release port 3, whereby air is released from the spring brake port 21.

The supply pressure path 70 is divided, here in the main-valve-side part 70.2, into a supply branch 74 and a control branch 76.

In the present case, the parking brake valve unit 9 has a main valve unit 10. The main valve unit 10 includes a pilot unit 12 and a pneumatically actuated main valve 18. The pilot unit 12 is configured to provide a pilot pressure pSV at a control port 18.3 of the pneumatically actuated main valve 18 in dependence on the electronic parking brake signal SFB. The pneumatically actuated main valve 18 is configured to output the parking brake pressure pBP, which is provided at the spring brake port 21, at a main port 18.2 in dependence on this pilot pressure pSV. The pneumatically actuated main valve 18 is in the present case in the form of a relay valve 20. Via a main valve supply port 18.1, the main valve 18 can receive the supply pressure pV from the supply branch 74. The main valve 18 has an optional main valve return spring 27 which is advantageously configured to bias the main valve 18, in particular the relay valve 20, into an air release position in which air is released from the spring brake port 21. It is thus advantageously achieved that, when the pressure in the control port 18.3 is below a specific minimum pilot pressure, for example 0.08 MPa, the main valve 18 is in the air release position.

The pilot unit 12 has a first pilot valve 41 and a second pilot valve 42, which are each in the form of 2/2-way solenoid valves. Via the first pilot valve 41, in an open position 41A, the supply pressure pV from the supply pressure path 70 can be provided as pilot pressure pSV at a control line 43. The control line 43 is arranged between the first pilot valve 41 and the second pilot valve 42 and is pneumatically connected or connectable to the control port 18.3 of the main valve 18. By switching the first pilot valve 41 into a closed position 41B, the pilot pressure pSV can be trapped or held in the control line 43, in particular at the control port 18.3, for permanent actuation. The second pilot valve 42 is thereby likewise in a closed position 42B. Corresponding to the construction of the pilot unit 12 with a first pilot valve 41 and a second pilot valve 42, the electronic parking brake signal SFB includes a first electronic parking brake signal SFB1 for actuating the first pilot valve 41 and a second electronic parking brake signal SFB2 for actuating the second pilot valve 42. By switching the second pilot valve 42 into an open position 42A, the control line 43 can be pneumatically connected to the air release line 44 for releasing air from the control port 18.3. Alternatively, the first pilot valve 41 and the second pilot valve 42 can also be replaced by one or more 3/2-way valves.

The control line 43 can additionally be pneumatically connected to an emergency release port 84 and/or to an additional parking brake port 82. Via the emergency release port 84, an emergency release pressure pSN can be provided at the control line 43 and in particular at the control port 18.3, in order to output a parking brake pressure pBP at the spring brake port 21 independently of the pilot unit 12. In particular, via the emergency release port 84, movability of the commercial vehicle 201 can be established in a controlled manner in the event of a failure of the brake system 202 or a similar fault which leads to engagement of the parking brake function FFS. There is advantageously arranged at the emergency release port 84 a check valve 85 which opens in the direction of the control port 18.3 and closes in the opposite direction. Via the check valve 85, an uncontrolled escape of the pilot pressure pSV via the emergency release port 84 can advantageously be avoided. Via the check valve 85, a one-time inputted emergency release pressure pSN can also permanently be trapped or held in the control line 43 for permanently admitting air to the spring brake port 21 and thus for releasing at least one parking brake cylinder.

Via the additional parking brake port 82, an additional parking brake pressure pSZ can be provided at the control line 43 and in particular at the control port 18.3 in order to output a parking brake pressure pBP at the spring brake port 21 independently of the pilot unit 12. In particular, the additional parking brake pressure pSZ can be provided by a service brake function (not shown here), in order to implement an anti-compound function.

The electropneumatic valve assembly 1 further advantageously has a selection valve 88 which is arranged in the control line 43 and is in the form of a select-high valve. The selection valve 88 has a first selection valve port 88.1 which is connected to the additional parking brake port 82, a second selection valve port 88.2 which is connected to the emergency release port 84, and a third selection valve port 88.3 which is connected to the control port 18.3. The selection valve 88 is configured to connect to the third selection valve port 88.3 the selection valve port, from the first selection valve port 88.1 and the second selection valve port 88.2, at which the higher pressure is present.

The electropneumatic valve assembly 1 has a first pressure sensor 64, which is pneumatically connected to the spring brake port 21, for measuring the parking brake pressure pBP.

The electropneumatic valve assembly 1 has a trailer valve unit 90 for supplying a trailer 207 of the commercial vehicle 201 with a trailer supply pressure pVA. The trailer valve unit 90 has a trailer supply valve 92, which in the present case is in the form of a pneumatic 3/2-way valve and to which a trailer control pressure pSA can be applied via a trailer control port 92.4 for the purpose of switching.

The trailer supply valve 92 has a first trailer supply valve port 92.1, which is pneumatically connected to the supply pressure path 70. The trailer supply valve 92 has a second trailer supply valve port 92.2, which is pneumatically connected to a trailer supply pressure port 96. The trailer supply valve 92 has a third trailer supply valve port 92.3, which is pneumatically connected to the air release line 44.

In a trailer supply position 92A, the first trailer supply valve port 92.1 is pneumatically connected to the second trailer supply valve port 92.2 so as to pneumatically connect the supply pressure path 70 to the trailer supply pressure port 96 in order to supply the trailer supply pressure pVA.

In a trailer air release position 92B, the second trailer supply valve port 92.2 is pneumatically connected to the third trailer supply valve port 92.3 so as to connect the trailer supply pressure port 96 to the air release line 44 for the purpose of releasing air.

The electropneumatic valve assembly 1 has a second pressure sensor 65, which is pneumatically connected to the trailer supply port 96, for measuring the trailer supply pressure pVA.

The trailer pilot unit 94 has in the present case a first trailer pilot valve 97 and a second trailer pilot valve 98. The first trailer pilot valve 97 is in the form of a 2/2-way solenoid valve and is controllable by a first electronic trailer brake signal SBA1. In an open position 97A, the first trailer pilot valve 97 connects the supply pressure path 70 to a trailer control branch 95, which is in turn pneumatically connected to the trailer control port 92.4. By switching the first trailer pilot valve 97 into the open position 97A, the trailer supply valve 92 can thus be switched into the trailer supply position 92A. In a closed position 97B, the first trailer pilot valve 97 is correspondingly closed and the supply pressure path 70 is separated from the trailer control branch 95.

The second trailer pilot valve 98 is controllable by a second electronic trailer brake signal SBA2. The second trailer pilot valve 98 is in the form of a 3/2-way solenoid valve, whereby, in the closed position 98B, the trailer control pressure pSA is not trapped completely in the trailer control branch 95—as in the case of the second pilot valve 42—but is pneumatically connected to the trailer supply port 96 via a throttled connection. In this manner, a self-holding function of the trailer supply valve 92 is advantageously implemented, since the outputted trailer supply pressure pVA is fed back via the second trailer pilot valve 98 in the closed position 98B in a throttled manner to the trailer control port 92.4. In this manner, a pressure drop can be avoided in the event of any leakages in the trailer control branch 95.

The electropneumatic valve assembly 1 has an electronic control unit 99, which is connected in a signal-and/or energy-carrying manner to the electronic components of the electropneumatic valve assembly 1. In particular, the first pilot valve 41, the second pilot valve 42, the first trailer pilot valve 97 and the second trailer pilot valve 98 are in the present case electrically connected to the electronic control unit 99 for actuation. The first pressure sensor 64 and the second pressure sensor 65 are also electrically connected to the electronic control unit 99.

Figure 2:
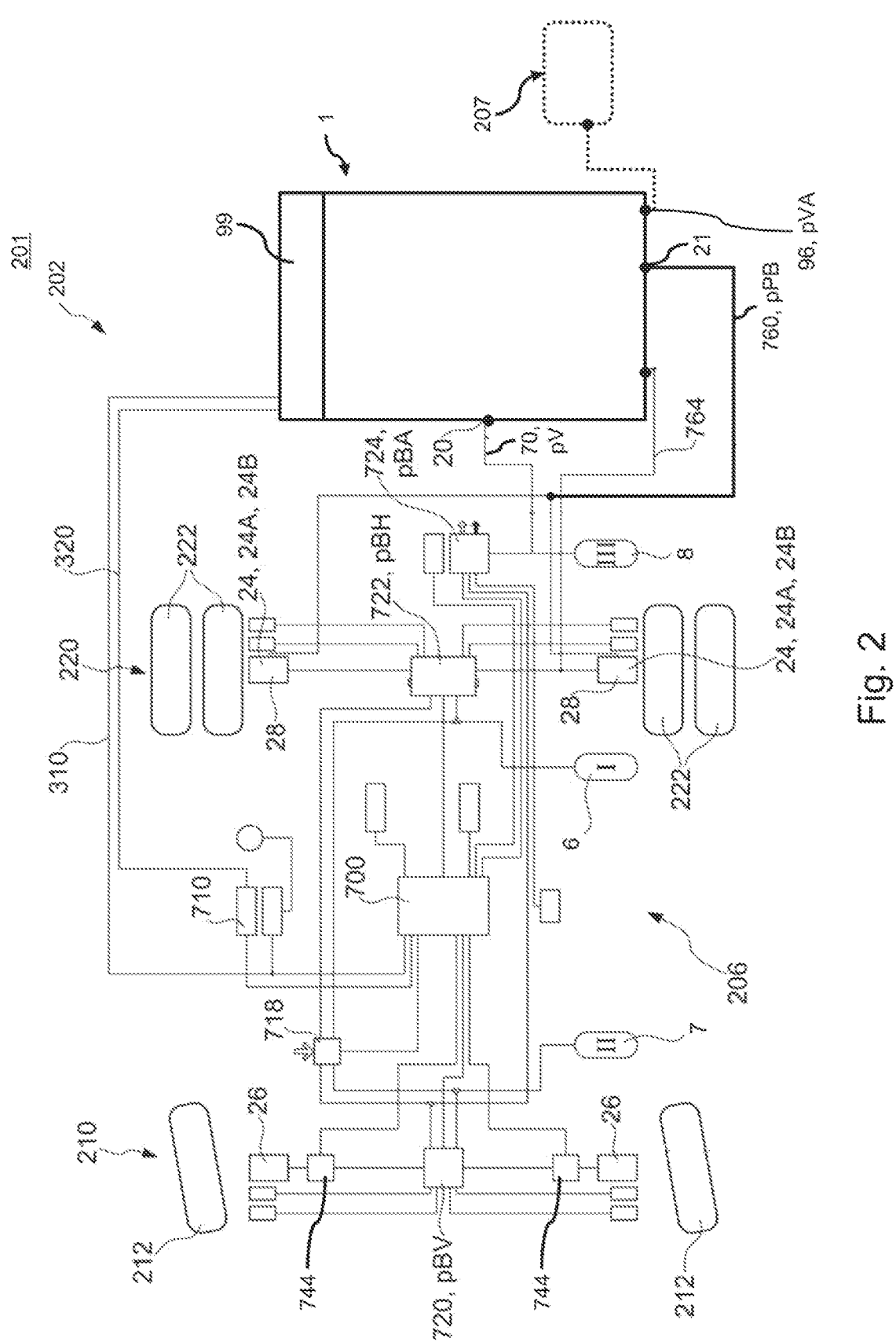

FIG. 2 shows an electropneumatic brake system 202. The electropneumatic brake system 202 is in the present case used in a commercial vehicle 201, which is here shown highly diagrammatically, in particular with two front wheels 212 of a front axle 210 and four rear wheels 222 of a rear axle 220.

A central control unit 700 is connected in a signal-carrying manner to an electronic control unit 99 of the electropneumatic valve assembly 1 via a central control line 310. The control unit 99 is further supplied with electric power from a power supply 710 via a supply line 320.

Two service brake cylinders 26 of a service brake function FBS, which are each associated with a front wheel 212 of the front axle 210, can be actuated via a brake signal transmitter 718 for braking actuation, wherein compressed air from a second compressed air supply 7 is admitted to the service brake cylinders 26 via a front axle modulator 720, in that the front axle modulator 720 provides a front axle brake pressure pBV.

In an analogous manner, two parking brake cylinders 24, which are each associated with the rear wheels 222 of the rear axle 220, can have a service brake chamber 28 which, under the control of the brake signal transmitter 718, can be supplied with compressed air from a first compressed air supply 6 via a rear axle modulator 722 for the purpose of braking. For this purpose, the rear axle modulator 722 provides a rear axle brake pressure pBH.

The brake system 202 further has a trailer control valve 724 for providing a trailer brake pressure pBA, which can be pneumatically connected to a trailer 207 (not shown here) of the commercial vehicle 201 for the purpose of supplying a brake system of the trailer.

The two parking brake cylinders 24 each have a spring brake and are pneumatically connected via a parking brake line 760 to a spring brake port 21 of the electropneumatic valve assembly 1.

Via the rear axle modulator 722, the rear axle brake pressure pBH can be provided as additional control pressure pZ at the additional brake pressure port 41 via the additional actuation line 764, in particular within the context of an anti-compound function.

The electropneumatic valve assembly 1 is provided with a supply pressure pV, here from a third compressed air supply 8, via a supply pressure path 70. Equally, in other embodiments, the supply pressure path 70 can easily be connected to a different compressed air supply, in particular to the first compressed air supply 6 or to a second compressed air supply 7. Particularly preferably, in some embodiments, two compressed air supplies can be connected to the supply pressure path 70 via a supply shuttle valve 49 as shown in FIG. 1. The electropneumatic valve assembly 1 is advantageously supplied via at least one compressed air supply, the supply pressure of which can purposively be lowered, in particular via a valve of the service brake function FBS. Such a valve can be an ABS valve 744, for example.

Via the rear axle modulator 722, the rear axle brake pressure pBH can be provided as additional control pressure pZ at the additional brake pressure port 41 via the additional actuation line 764, in particular within the context of an anti-compound function.

The control unit 99 is supplied with electric power from a power supply 710 via a supply line 320.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 electropneumatic valve assembly
3 air release port
6 first compressed air supply
7 second compressed air supply
8 third compressed air supply
9 parking brake valve unit
10 main valve unit
12 pilot unit
18 main valve
18.1 main valve supply port
18.2 main port
20 relay valve
18.3 control port
21 spring brake port
24 parking brake cylinder
24A release position of the parking brake cylinder
24B braking position of the parking brake cylinder
26 service brake cylinder

11

27 main valve return spring
28 service brake chamber
41 first pilot valve
41A open position of the first pilot valve
41B closed position of the first pilot valve
42 second pilot valve
42A open position of the second pilot valve
42B closed position of the second pilot valve
43 control line
44 air release line
49 supply shuttle valve
50 safety valve
50.1 first safety valve port
50.2 second safety valve port
51 3/2-way valve
52 air admission position of the safety valve
50.3 third safety valve port
54 air release position of the safety valve
58 safety valve control port
62 actuation path
64 first pressure sensor
65 second pressure sensor
70 supply pressure path
70.1 supply-side part of the supply pressure path
70.2 main-valve-side part of the supply pressure path
72 main portion of the supply pressure path
74 supply branch of the supply pressure path
76 control branch of the supply pressure path
82 additional parking brake port
84 emergency release port
85 check valve
88 selection valve
88.1 first selection valve port
88.2 second selection valve port
90 trailer valve unit
88.3 third selection valve port
92 trailer supply valve
92A trailer supply position
92B trailer air release position
92.1 first trailer supply valve port
92.2 second trailer supply valve port
94 trailer pilot unit
92.3 third trailer supply valve port
95 trailer control branch
92.4 trailer control port
96 trailer supply pressure port
97 first trailer pilot valve
97A open position of the first trailer pilot valve
97B closed position of the first trailer pilot valve
98 second trailer pilot valve
98A open position of the second trailer pilot valve
98B closed position of the second trailer pilot valve
99 electronic control unit
201 commercial vehicle
202 electropneumatic brake system
207 trailer
210 front axle
212 front wheel
220 rear axle
222 rear wheel
310 central control line
320 supply line
700 central control unit
710 power supply
718 brake signal transmitter
720 front axle modulator
722 rear axle modulator

12

724 trailer control valve
744 ABS valve
760 parking brake line
764 additional actuation line
FBS service brake function
FFS parking brake function
pBP parking brake pressure
pKS compensation valve control pressure
pSA trailer control pressure
PSN emergency release pressure
PSV pilot pressure
pSW threshold value
pSW1 first threshold value
pSW2 second threshold value
pSZ additional parking brake pressure
pV supply pressure
pVA trailer supply pressure
SFB electronic parking brake signal
SFB1 first electronic parking brake signal
SFB2 second electronic parking brake signal
SBA electronic trailer brake signal
SBA1 first electronic trailer brake signal
SBA2 second electronic trailer brake signal

What is claimed is:

1. An electropneumatic valve assembly for actuating a parking brake function of an electropneumatic brake system of a commercial vehicle, the electropneumatic valve assembly comprising:

a parking brake valve unit (A) pneumatically connected to a supply pressure path in order to receive supply pressure from said supply pressure path and (B) pneumatically connected to at least one spring brake port in order to output a parking brake pressure at said at least one spring brake port in dependence upon an electronic parking brake signal;

a pneumatically switchable safety valve configured to connect the supply pressure path to a compressed air supply;

said pneumatically switchable safety valve having a supply position in which said pneumatically switchable safety valve connects the compressed air supply to the supply pressure path;

said pneumatically switchable safety valve further having an air release position in which said pneumatically switchable safety valve releases air from the supply pressure path;

said pneumatically switchable safety valve having a pneumatic safety valve control port configured to connect to the compressed air supply and to receive the supply pressure therefrom;

said pneumatically switchable safety valve being configured to switch into the supply position if the supply pressure provided by the compressed air supply exceeds a first threshold value;

said parking brake valve unit having a main valve unit which is pneumatically connected via the supply pressure path to the compressed air supply and is configured to output the parking brake pressure at said at least one spring brake port in dependence upon the electronic parking brake signal;

a pilot unit;

said main valve unit having a pneumatically actuated main valve which is controllable via said pilot unit in dependence upon the electronic parking brake signal;

said pilot unit being pneumatically connected to a control port of said pneumatically actuated main valve in order to provide a pilot pressure;

said pneumatically actuated main valve being pneumatically connected to a supply branch of the supply pressure path in order to receive the supply pressure; and, said pilot unit being pneumatically connected to a control branch of the supply pressure path in order to receive the supply pressure.

2. The electropneumatic valve assembly of claim 1, wherein said pneumatically switchable safety valve is arranged in the supply branch.

3. The electropneumatic valve assembly of claim 1, wherein said pneumatically switchable safety valve is arranged in the control branch.

4. The electropneumatic valve assembly of claim 1, wherein said pneumatically actuated main valve has a main valve return spring configured to switch said pneumatically actuated main valve into a main valve position, in which air is released from said at least one spring brake port, when the pilot pressure is less than a minimum pilot pressure.

5. The electropneumatic valve assembly of claim 1, wherein said pneumatically actuated main valve is a relay valve.

6. The electropneumatic valve assembly of claim 1 further comprising an emergency release port configured to be pneumatically connected to the control port of said pneumatically actuated main valve in order to provide an emergency release pressure.

7. An electropneumatic brake system for a commercial vehicle comprising the electropneumatic valve assembly of claim 1.

8. An electropneumatic valve assembly for actuating a parking brake function of an electropneumatic brake system of a commercial vehicle, the electropneumatic valve assembly comprising:

a parking brake valve unit (A) pneumatically connected to a supply pressure path in order to receive supply pressure from said supply pressure path and (B) pneumatically connected to at least one spring brake port in order to output a parking brake pressure at said at least one spring brake port in dependence upon an electronic parking brake signal;

a pneumatically switchable safety valve configured to connect the supply pressure path to a compressed air supply;

said pneumatically switchable safety valve having a supply position in which said pneumatically switchable safety valve connects the compressed air supply to the supply pressure path;

said pneumatically switchable safety valve further having an air release position in which said pneumatically switchable safety valve releases air from the supply pressure path;

said pneumatically switchable safety valve having a pneumatic safety valve control port configured to connect to the compressed air supply and to receive the supply pressure therefrom;

said pneumatically switchable safety valve being configured to switch into the supply position if the supply pressure provided by the compressed air supply exceeds a first threshold value;

a trailer valve unit having a trailer supply valve configured to provide a trailer supply pressure at a trailer supply port in dependence upon an electronic trailer brake signal; and, said trailer valve unit being pneumatically connected to the supply pressure path in order to receive the supply pressure.

9. The electropneumatic valve assembly of claim 8 further comprising: a trailer pilot unit for providing a trailer control pressure in dependence upon the electronic trailer brake signal; and, said trailer supply valve being pneumatically actuatable in dependence upon the trailer control pressure.

10. The electropneumatic valve assembly of claim 8, wherein said pneumatically switchable safety valve has a return spring configured to switch said pneumatically switchable safety valve into the air release position; and, said return spring acts against the supply pressure present at said pneumatic safety valve control port.

11. The electropneumatic valve assembly of claim 10, wherein said return spring has a spring constant such that the safety valve automatically switches into the air release position when the supply pressure present at said pneumatic safety valve control port falls below the first threshold value.

12. A commercial vehicle comprising the electropneumatic valve assembly of claim 8.

13. The electropneumatic valve assembly of claim 8, wherein said safety valve is configured to switch into the air release position when the supply pressure provided by the compressed air supply falls below a second threshold value.

14. The electropneumatic valve assembly of claim 8, wherein said parking brake valve unit has a main valve unit which is pneumatically connected via the supply pressure path to the compressed air supply and is configured to output the parking brake pressure at the at least one spring brake port in dependence upon the electronic parking brake signal.

15. An electropneumatic valve assembly for actuating a parking brake function of an electropneumatic brake system of a commercial vehicle, the electropneumatic valve assembly comprising:

a parking brake valve unit (A) pneumatically connected to a supply pressure path in order to receive supply pressure from said supply pressure path and (B) pneumatically connected to at least one spring brake port in order to output a parking brake pressure at said at least one spring brake port in dependence upon an electronic parking brake signal;

a pneumatically switchable safety valve configured to connect the supply pressure path to a compressed air supply;

said pneumatically switchable safety valve having a supply position in which said pneumatically switchable safety valve connects the compressed air supply to the supply pressure path;

said pneumatically switchable safety valve further having an air release position in which said pneumatically switchable safety valve releases air from the supply pressure path;

said pneumatically switchable safety valve having a pneumatic safety valve control port configured to connect to the compressed air supply and to receive the supply pressure therefrom;

said pneumatically switchable safety valve being configured to switch into the supply position if the supply pressure provided by the compressed air supply exceeds a first threshold value; and, wherein said pneumatically switchable safety valve is a 3/2-way valve.

16. A commercial vehicle comprising the electropneumatic valve assembly of claim 15.

17. The electropneumatic valve assembly of claim 15, wherein said safety valve is configured to switch into the air release position when the supply pressure provided by the compressed air supply falls below a second threshold value.

18. The electropneumatic valve assembly of claim 15, wherein said parking brake valve unit has a main valve unit which is pneumatically connected via the supply pressure path to the compressed air supply and is configured to output the parking brake pressure at the at least one spring brake port in dependence upon the electronic parking brake signal.

19. The electropneumatic valve assembly of claim 15, wherein said pneumatically switchable safety valve has a return spring configured to switch said pneumatically switchable safety valve into the air release position; and, said return spring acts against the supply pressure present at said pneumatic safety valve control port.

20. The electropneumatic valve assembly of claim 19, wherein said return spring has a spring constant such that the safety valve automatically switches into the air release position when the supply pressure present at said pneumatic safety valve control port falls below the first threshold value.

\* \* \* \* \*